United States Patent Office 3,657,144
Patented Apr. 18, 1972

3,657,144
ENCAPSULATION PROCESS
Noble H. Yoshida, Dayton, Ohio, assignor to The National Cash Register Company, Dayton, Ohio
No Drawing. Filed June 5, 1967, Ser. No. 643,397
Int. Cl. B01j *13/02;* B44d *1/02*
U.S. Cl. 252—316
5 Claims

ABSTRACT OF THE DISCLOSURE

A novel method is provided for encapsulating, en masse, in walls of polymeric material, minute solid or liquid particles by a liquid-liquid phase separation technique employing liquid evaporation. Separation of a polymer-rich wall-forming liquid phase from a manufacturing vehicle and subsequent encapsulation of intended capsule core entities dispersed in the vehicle are accomplished by evaporation of a solvent liquid component. Components of the liquid-liquid phase separation process carried on by evaporation include (a) polymeric film-forming material; (b) a suspending liquid which is not a solvent for the polymeric material; and (c) a relatively volatile solvent liquid which is miscible with the suspending liquid and is a solvent for the polymeric material.

---

This invention relates to a process for en masse preparation of minute capsules wherein capsule walls of polymeric film-forming material are produced by a new and improved technique to bring about liquid-liquid phase separation. The process, more specifically, pertains to encapsulation wherein the liquid-liquid phase separation is accomplished by evaporation of a solvent liquid from a liquid capsule-manufacturing system, which system comprises, in solution, (a) polymeric film-forming material, (b) a suspending liquid which is not a solvent for the polymeric material, and (c) a relatively volatile solvent liquid which is miscible with the suspending liquid and which is a solvent for the polymeric material.

Liquid-liquid phase separation processes as well known and are so named because, in these processes, a liquid phase is caused to separate or emerge from a parent liquid vehicle. Liquid-liquid phase separation processes usually utilize, as at least one component therein, a polymeric material which, after the phase separation has occurred, exists, in part, in relatively concentrated solution in the separated phase. The concentrated solution of polymeric material present as the separated phase dispersed in the suspending liquid is used, in the subject encapsulation process, to form capule walls.

U.S. Pat. No. 3,155,590, which issued Nov. 3, 1964, on the application of Robert E. Miller and Jerrold A. Anderson and which was assigned to the assignee herein, discloses a method for encapsulating particles wherein liquid-liquid phase separation is accomplished in a similar system by addition of a polymeric phase-separation-inducing material to a solution of polymeric capsule-wall-forming material. Because the polymeric phase-separation-inducing material of the above-mentioned patent is non-volatile, capsules prepared by means of that process are washed by a solvent for the phase-separation-inducing material in order to remove residual phase-separation-inducing material which was entrained in the capsule walls during the capsule manufacturing process. It is apparent in the present invention that no material is added to the system to bring about the phase separation. Moreover, it will become apparent that there is no separation-inducing material to remove from the system. In another instance, disclosed in application for U.S. Letters Pat. No. 3,415,758, issued Dec. 10, 1968, on the application of Thomas C. Powell, Melvin E. Steinle, and Robert A. Yon- coskie, a similar system yielded an emergent phase of concentrated polymer solution upon the introduction (adding) of a phase-separation-inducing agent (a polymer) to make liquid-walled capsules which were hardened by addition of a chemical cross-linking agent.

In the present invention, no extraction of the phase-separation-inducing material or chemical hardening of the walls is necessary.

U.S. Pat. No. 3,242,051, which issued Mar. 22, 1966, on the application of Everett N. Hiestand, John G. Wagner, and Edwin L. Knoechel and which was assigned to the assignee herein, discloses a method for encapsulating particles wherein an added non-polymeric material is utilized as the phase-separation-inducing material. In the Hiestand et al. disclosure, the phase-separation-inducing material is a liquid which is miscible with solvent for the polymeric material but which does not, alone, dissolve the polymeric material. Addition of this non-solvent liquid to a solution of the polymeric material causes liquid-liquid phase separation wherein a separate liquid phase, relatively concentrated in polymeric material, emerges from the parent solution. The emergent liquid phase wets and enwraps intended capsule core entities which have been dispersed in the system. The polymeric material, once enwrapping the core entity particles, is caused to harden or become less soluble in the encapsulating system by further addition of phase-separation-inducing material.

Up to the time of this invention, a number of difficulties have existed with regard to the manufacture of capsules by means of liquid-liquid phase separation techniques.

Know processes which utilize the addition of materials to cause phase separation require steps for washing the finished capsules in order to remove any phase-separation-inducing material which may have been entrained in the capsule walls. Such washing steps require additional process time and solvent materials and, moreover, may not completely remove the entrained material.

Capsules which are made by processes which utilize non-polymeric phase-separation-inducing materials are commonly contaminated by residual phase-separation-inducing material left in the capsule walls. Encapsulation that is brought about by continued addition of phase-separation-inducing material to drive substantially all capsule-wall-forming polymeric material out of solution to be deposited onto intended capsule core entities or embryonic capsules, to enwrap them, usually involves large amounts of the potential contaminant. At any stage in the process for making capsules, at least two types of liquids stand a chance of being occluded within the deposited capsule-wall-forming polymeric material—one, a solvent for the capsule wall material; and another, a non-solvent for the capsule wall material. The occluded (in the walls) solvent liquid is, of course, diminished by dilution as non-solvent is added to the system, but such dilution is expensive, and its effect is decreased as solvent concentration in the system is decreased. Repeated after-washing of the capsules with non-solvent liquid is an alternate method to extensive dilution, but there is a danger of adversely affecting the capsule walls by immersing them in a liquid of composition different from that liquid retained as part of the capsule wall material. The possibility also exists that solvent liquid may be occluded within the capsule walls due to the walls' having been sealed by the skin-forming effect of contact with such non-solvent washing liquids. Repeated washing also requires large amounts of non-solvent material which must eventually be purified for further use or else discarded, and is therefore uneconomical. The above prior-art process requires a continuous addition of non-solvent liquid, and the composition of the final liquid system is not a correct balance of the different liquids to enable additional encapsulations to be performed therein without re-constitution. In order to be useful in further encapsulation, the liquids must, therefore, be separated, as by distillation, and recombined in the manner prescribed for the subject encapsulation process.

In the novel encapsulation process which is the subject of this invention, liquid-liquid phase separation is accomplished by evaporation from the system of a non-polymeric solvent liquid material and therefore consists of subtracting material from the system. As has been discussed, prior encapsulation processes which have utilized liquid-liquid phase separation have relied, instead, on addition of a phase-separation-inducing material to accomplish phase separation of capsule-wall-forming polymeric material. In the present novel process, phase separation is accomplished by evaporation, from a capsule-manufacturing system, of a solvent liquid which is (a) a solvent for the dissolved polymeric material; (b) of higher vapor pressure than other liquids in the manufacturing system; and (c) miscible with said other liquids. The present process, then, involves evaporation of a solvent liquid, while the prior art does not.

It is an object of this invention to provide a method for encapsulation by the use of liquid-liquid phase separation wherein phase separation is accomplished by evaporation of a relatively volatile portion of liquid capsule-manufacturing vehicle.

It is also an object of this invention to provide a method for preparing capsules by a liquid-liquid-phase separation process wherein the capsule walls are substantially free from contaminant materials.

It is also an object of this invention to provide an efficient method for preparing capsules by a liquid-liquid phase separation process wherein a lesser volume of liquid materials can be utilized to manufacture a given amount of capsules than has been previously possible. Not only is the liquid volume less, but no room must be left in the manufacturing vats for the addition of materials.

It is also an object of this invention to provide a method for preparing capsules by a liquid-liquid-phase separation process wherein liquid materials of the manufacturing vehicle are reclaimed by condensation of evaporated solvent during the encapsulation.

It is also an object of this invention, as will be described below, to provide a continuous, cyclic, process for manufacturing capsules, by batches, utilizing a liquid-liquid phase separation technique.

A system for manufacturing capsules by this novel process comprises the following components:

(a) polymeric film-forming material to be used for capsule walls, (b) suspending liquid which is a non-solvent for the polymeric film-forming materials, and (c) solvent liquid which dissolves the polymeric material and is miscible with, and has higher vapor pressure than, the suspending liquid. Material which is to be encapsulated by the novel process must, of course, be insoluble in both the suspending liquid and the solvent liquid. Such material (intended capsule-core entities) is usually provided in the form of finely-divided entities and may be solid particles or liquid droplets.

In manufacturing capsules according to one embodiment of the novel method, a solution is prepared of polymeric material at a certain concentration in a liquid system having a predetermined ratio of suspending liquid to solvent liquid. Intended capsule core entities are dispersed in the solution by agitation, and the agitating dispersion is heated to evaporate the solvent liquid. As the solvent liquid is evaporated, the residual liquid system of suspending liquid and solvent liquid becomes a progressively poorer solvent for the polymeric material until enough of the solvent liquid has been evaporated that a new liquid phase, relatively concentrated in polymeric material, emerges from solution and forms discrete liquid globules dispersed in the parent liquid system among the previously dispersed intended capsule core entities. At some point in the emergence of the new liquid phase, globules of the liquid phase wet and enwrap the intended capsule core entities to yield liquid-walled, embryonic, capsules. Evaporation of the solvent liquid is continued, causing continued emergence of the new liquid phase. As the liquid system becomes more concentrated in suspending liquid and, therefore, a poorer solvent for the polymeric material, the phase-separated liquid becomes more concentrated in polymeric material, and the polymeric material therein becomes more dense and viscous. Evaporation is continued until substantially all of the solvent liquid has been driven off and the residual liquid system is substantially pure suspending liquid with capsules dispersed therein. At this point, substantially all of the polymeric material has emerged from solution and is present as dense, solid, capsule wall material—substantially free from contaminants—enwrapping individual capsule core entities. Capsules may be then isolated by simple decantation, and, if desired, residual suspending liquid may be washed from the outer surface of the capsule walls by means of a volatile solvent for the suspending liquid which is not a solvent for the polymeric material.

There are several obvious modifications which can be applied to the above process; for example, the intended capsule core entities need not be dispersed in the liquid system until after emergence of the new liquid phase. Of course, care must be exercised not to disperse the core entities so late in the process that the polymeric material has become too viscous to form capsule walls.

The total amount of solvent liquid utilized in the process need not necessarily be enough to result in complete solution of polymeric material in the liquid system. The encapsulation process can be successfully carried out if solvent liquid is added to a dispersion or a mixture of solid polymeric material in suspending liquid in an amount adequate to allow the solid polymeric material to become mobile, liquid, globules relatively concentrated in polymeric material, which globules do not dissolve in, but are dispersed in, the liquid system. In the above modification, the actual step of liquid-liquid phase separation, while perhaps not apparent at first sight, does occur, as the solid polymeric material is dissolved and almost simultaneously emerges as a liquid phase.

As another modification to the novel process, liquid-liquid phase separation can be performed by adding a solution of the polymeric material in solvent liquid to a predetermined volume of the suspending liquid. This addition of polymeric material solution, if not added gradually, may give rise to local concentration gradients wherein the polymeric material temporarily takes the form of a separated viscous liquid or even solid phase; but, if a solution of the proper concentration of polymeric material is added in proper amount, any desired degree of liquid phase separation, or none at all, will result upon the attainment of equilibrium with continued agitation. Conversely, liquid-liquid phase separation can be accomplished by addition of suspending liquid to a solution of polymeric material in solvent liquid.

Solvent liquid vapors from the evaporation step of the encapsulation process can be condensed and utilized repeatedly in future cycles of the encapsulation process. The evaporation step of the process, as above stated, can be continued until substantially all of the solvent liquid has been evaporated, leaving behind a dispersion of capsules in substantially pure suspending liquid. Removal of the capsules leaves the suspending liquid separated from the solvent liquid, with each liquid component being in a substantially pure state. A continuous encapsulation process utilizing the present invention is accomplished, in one of several possible embodiments, by condensing solvent liquid vapors from a first encapsulation cycle into a closed vessel containing polymeric material for use in a second encapsulation cycle. Upon completion of the first encapsulation cycle, the capsules which have been produced are taken from the suspending liquid and the polymeric material, now dissolved in the solvent liquid (which dissolution was aided by heat from the condensed solvent liquid) is added to the suspending liquid along with entities or particles to be encapsulated during the second encapsulation cycle. The vessel for condensate is replenished with polymeric material for a third encapsulation cycle, and so forth, repeatedly. The amount of polymeric material to be added depends, of course, on the amount, the particle size, and the physical nature of the intended core entities and on the desired or required physical characteristics of the finished capsules.

Encapsulation by this novel process involves physical phenomena and not chemical reactions, and, hence, the chemical properties of the component materials are not of primary consideration. Also, the process is operable throughout a broad range of conditions. Since many different solvent liquids and suspending liquids can be used, it is impossible to note specific temperatures at which encapsulation should be carried out. As a general rule, encapsulation is performed at a temperature nearly equal to the boiling point of the solvent liquid. The preferred temperature range for encapsulation may vary from a few degrees below the boiling point up to the boiling point of the solvent liquid. If a combination of solvent liquid and suspending liquid is chosen which evaporates as an azeotrope, the solvent liquid is evaporated in combination with some of the suspending liquid, and capsules can be made nevertheless.

Evaporation rate is, of course, increased as the vapor pressure of the solvent liquid is increased, and, at boiling temperature, vapor pressure of a boiling liquid is equal to ambient pressure of the environment. Encapsulation can be performed in closed systems having environmental pressures lower than atmospheric pressure, which lower pressure affords decreased boiling temperature of the solvent liquid and, thereby, a lower operating temperature. An encapsulation process performed in a low-pressure environment can make use of low-vapor-pressure solvent liquids which would, in ordinary atmospheric conditions, require a temperature too high for practical operation. A higher-than-atmospheric pressure can also be used for the encapsulation process if it be required or desired to do so, the higher pressure serving to elevate boiling points and reduce evaporation rates, as would be desired when an extremely volatile solvent liquid must be used.

With regard to materials which can be encapsulated by the novel process, it should be remembered that the process is mainly one of physical phenomena and not of chemical reactions. Any material, otherwise eligible, which is not altered by chemical reaction with components in the encapsulating system and which is not dissolved by, or miscible with, the solvent or suspending liquids can be encapsulated by the novel system. A few examples of such materials available, as capsule core entities, for use with the novel process include salts, such as sodium chloride, potassium hydroxide, magnesium sulfate, potassium dichromate, and the like; oxides, such as zinc oxide, antimony trioxide, titanium dioxide, and the like; water and aqueous solutions or dispersions; cellulosic fibers or wood and the like; glycerine, polyethylene glycol, ethylene glycol, and the like; synthetic polymeric solids and liquids, such as fluorinated hydrocarbons, epoxy resins, poly(methyl methacrylate), poly(vinyl pyrrolidone), and the like; elemental metals; glass; minerals; pigments; and many other materials, this listing being intended to be illustrative of the scope of materials and not limiting. Various structural particles can constitute the capsule contents, such as micro-capsules themselves, various solid molding powders, explosives, pharmaceuticals, and the like.

Capsules prepared by the novel process have a preferable size range of from 100 to 2,000 microns, but can vary in size from a few microns to serveral thousand microns in diameter, or perhaps slightly larger. The capsules can exist an individual entities or as aggregates of capsule core entities, the tendency for aggregation during the encapsulation process increasing as the size of intended capsule core entities decreases. The weight ratio of capsule core entity material to polymeric capsule wall material can range from greater than 99 percent, wherein each entity is covered by only a very thin film of polymeric material, to essentially zero percent, wherein solid particles of polymeric material are manufactured around a "seed" particle. The preferred range of capsule core to capsule wall weight ratio is from about 50 percent to about 98 percent.

A few examples of suspending liquids which can be used in the practice of this invention include high-boiling-point hydrocarbons, such as kerosene silicone fluids and oils; fluorinated hydrocarbons; and the like.

A few examples of solvent liquids which can be used in the practice of this invention include low-boiling-point hydrocarbons; ethers; alcohols; aromatics, such as benzene and toluene; and the like.

Examples of polymeric capsule-wall-forming materials which can be used in the practice of this invention include ethyl cellulose; nitrocellulose; polyethylene; poly-(ethylene-co-acrylic acid); vinylidene chloride polymers or copolymers; chlorinated natural rubber; vinyl polymers and copolymers; and the like.

Some objects of this invention having been mentioned, and the invention having been described in detail, particular embodiments of the invention will now be described, from which descriptions further objects of the invention will become apparent to those skilled in the art. It should be remembered that the following disclosure of specific embodiments is in no way intended to limit the invention, being offered only to describe the invention further.

EXAMPLE I

The capsule wall material in this example is ethylcellulose polymeric material (sold by Dow Chemical Company, Midland, Mich., United States of America, under the designation "N-100") characterized by having an ethoxyl content of 48.0 percent to 49.5 percent, by weight, and a viscosity of about 90 to 110 centipoises at 25 degrees centigrade in a 5 percent, by weight, solution of a solvent consisting of 20 percent, by volume, ethyl alcohol in toluene. Four grams of the ethyl cellulose material was dissolved in a vesel containing an agitating liquid system consisting of 80 grams of acetone—the solvent liquid—and 140 grams of a relatively non-volatile hydrocarbon liquid — the suspending liquid (sold as "Dispersol-81515" by Shell Chemical Company, New York, N.Y., United States of America, and characterized by having (a) aromatics content—1%, naphthenes content—50%, and paraffins content—49%, by volume; (b) distillation range, 199 to 258 degrees centigrade; (c) Kauri-Butanol number equal to 29.2 as specified in ASTM D-1133). The resulting solution evidenced no phase separation at about 25 degrees centigrade and above. Thirty-six grams of crystalline potassium dichromate particles of a size similar to the size of grains of sand was dispersed in the agitating solution, and the resulting dispersion was heated to about 50 degrees centigrade to eyaporate the acetone. As the acetone was evaporated, a liquid phase, containing a relatively high concentration of dissolved ethyl cellulose, emerged, and globules of the separated liquid phase wetted and enveloped the dispersed particles. As evaporation of the acetone was continued, the globules of ethyl cellulose solution could be observed, by use of microscope, to become progressively more viscous until, finally, the ethyl cellulose formed a solid capsule wall and the particles were enwrapped or encapsulated. When all of the acetone had been evaporated, the capsules were removed from the suspending liquid, and residual suspending liquid was rinsed from the capsule wall surfaces with a volatile (low-boiling-point) petroleum distillate. Pure non-solvent liquid remaining in the vessel and was reconstituted to the original encapsulating composition with another ethyl cellulose-acetone solution in order to encapsulate sodium chloride crystals by the same method.

EXAMPLE II

In this example, encapsulation of a liquid material is disclosed. The polymeric capsule-wall-forming material was the same kind of ethyl cellulose as that specified in the previous example, and the solvent liquid was acetone. The suspending liquid was poly(ethylene glycol) having an approximate molecular weight of 600 (sold as "Carbowax 600" by Union Carbide Corporation, New York, N.Y., United States of America). Four grams of the ethyl cellulose was dissolved in an agitating liquid system consisting of 200 grams of the poly(ethylene glycol) and 300 grams of acetone. Into the resulting liquid solution of ethyl cellulose was dispersed 50 grams of a silicone fluid poly(dimethyl siloxane) sold by Dow Corning Corporation, Midland, Mich., United States of America, as "DC-200" and characterized by having a viscosity of about 50 centistokes. The agitating liquid system of dispersed silicone fluid was then warmed to an elevated temperature of about 50 to 55 degrees centigrade to evaporate the acetone. The elevated temperature and the agitation were maintained for about four to five hours to evaporate all of the acetone. Silicone fluid droplets encapsulated by a solid capsule wall of ethyl cellulose remained dispersed in the poly(ethylene glycol) non-solvent liquid. The dispersion was cooled, and the capsules were isolated and rinsed with water, a solvent for the suspending liquid of this example.

EXAMPLE III

In this example, encapsulation was performed at a constant temperature in a reduced-pressure atmosphere. The polymeric capsule-wall-forming material was chlorinated polyisoprene having approximately 68 percent, by weight, chlorine and a viscosity of 10 to 15 centipoises in 10 percent, by weight, solution of toluene at 25 degrees centigrade (sold as "Parlon S-125" by Hercules Powder Company, Incorporated, Wilmington, Del., United States of America). The solvent liquid was methylene chloride. Two grams of the specified chlorinated polyisoprene, 200 grams of n-heptane, and 600 grams of methylene chloride were placed in a two-liter-capacity, glass reaction flask fitted for agitation and evacuation and immersed in a constant-temperature bath maintained at 24 degrees centigrade. The materials were agitated to form a clear solution, and 20 grams of sodium chloride, insoluble in the liquids and having a particle size similar to the size of particles of common table salt, was added to the flask. While the agitation and the temperature were maintained constant, the flask was evacuated to an absolute pressure of about 650 milliliters of mercury to evaporate the solvent liquid, methylene chloride. As solvent liquid was removed from the flask the polymeric material formed a separated liquid phase, which wetted and coated the dispersed sodium chloride crystals. Further evaporation of the solvent liquid caused the separated and deposited polymeric material to contract into a firmer coating than before, and complete evaporation of the solvent liquid caused the polymeric material to form a tough polymeric capsule wall around each individual sodium chloride particle. After the solvent liquid had been removed, the reaction flask was opened, and the capsules containing sodium chloride crystals were separated from the n-heptene suspending liquid and washed with fresh n-heptene.

What is claimed is:

1. A process for en masse preparation of minute capsules comprising the steps of:
   (a) establishing an agitating, three-phase dispersion consisting of a first phase of minute intended capsule core entities, a second phase of a solution of polymeric film-forming material in a manufacturing vehicle consisting of a combination of solvent liquid and suspending liquid, the solvent liquid being provided to dissolve the polymeric material and having a relatively higher vapor pressure than the suspending liquid, and a third phase of minute, mobile globules of a relatively concentrated solution of the polymeric film-forming material, in liquid consisting of the solvent liquid and the suspending liquid, said mobile globules being insoluble in the second phase and having a propensity for wetting and enwrapping the first phase core entities;
   (b) evaporating a portion of the liquid solvent, thereby causing emergence, from the second phase, of an additional amount of polymeric material as mobile globules to enwrap the first phase core entites; and
   (c) continuing evaporation of the solvent liquid to a condition where the enwrapped polymeric material has been insolubilized to form a solid capsule wall.

2. A process for en masse preparation of minute capsules comprising the steps of:
   (a) establishing an agitating liquid system of intended capsule core entities dispersed in a solution of polymeric capsule-wall-forming material, the system comprising a combination of at least two miscible liquids at least one of which is a solvent liquid necessary for dissolving the polymeric capsule-wall-forming material and having a higher vapor pressure relative to remaining liquid in the system;
   (b) evaporating a portion of the relatively high vapor pressure solvent liquid to a point, with regard to concentration, where the polymeric material is saturated in the remaining liquid combination; and
   (c) continuing the evaporation of the relatively high vapor pressure solvent liquid to cause separation, from the remaining liquid combination, of a liquid phase having a high concentration of polymeric material relative to the remaining liquid combination, which separated liquid phase contacts and enwraps capsule core entities to form firm-walled capsules.

3. The process of claim 2 wherein there is the additional step of:
   (d) evaporating substantially all of the solvent liquid to leave a dispersion of solid-walled capsules insoluble in the suspending liquid.

4. A method for en masse preparation of minute capsules comprising the steps of:
   (a) establishing an agitating three-phase, solid-in-liquid, dispersion consisting of a first phase of intended capsule core entities and a second phase of solid polymeric film-forming material, each of said first and second phases being insoluble in a continuous third phase of suspending liquid;
   (b) adding to the dispersion (a), once established, a solvent liquid immiscible with said first phase of intended capsule core entities, miscible with said second and third phases of solid polymeric material and suspending liquid, respectively, and having a higher vapor pressure than said second and third phases to yield a dispersion of intended capsule core entities and mobile liquid globules of polymeric film-forming solution in a continuous liquid phase of solvent liquid and suspending liquid, the agitation causing the mobile liquid globules and the intended capsule core entities to be interspersed to form liquid-walled capsules; and, with continued agitation,
   (c) evaporating substantially all of said solvent liquid to leave a dispersion of solid-walled capsules insoluble in the suspending liquid.

5. A process for continuous, en masse, preparation, in batches, of minute capsules comprising the steps of:
   (a) establishing an agitating system of intended capsule core entities dispersed in a suspending liquid;
   (b) adding to the system a predetermined amount of a solution of polymeric film-forming material in a solvent liquid wherein the solvent liquid is a solvent for, and has a higher vapor pressure than, the suspending liquid, and the polymeric material is insoluble in the suspending liquid, to yield a dispersion, in the suspending liquid, of intended capsule core entities and liquid, mobile, globules of polymeric material dissolved in solvent liquid;

(c) continuing the agitation to cause the liquid globules to wet and enwrap the intended capsule core entities to form liquid-walled capsules;

(d) with continued agitation, evaporating substantially all of the solvent liquid to leave a dispersion of solid-walled capsules insoluble in the suspending liquid;

(e) condensing and thus recovering the evaporated solvent liquid in a vessel apart from the system and dissolving therein solid polymeric film-forming material to yield the predetermined amount of solution as for use in step (b);

(f) removing the capsules from the suspending liquid; and (g) repeating steps (a) through (f), reusing the suspending liquid.

References Cited
UNITED STATES PATENTS

| | | | |
|---|---|---|---|
| 3,080,318 | 3/1963 | Claus | 117—100 X |
| 3,155,590 | 11/1964 | Miller et al. | 252—316 X |
| 3,173,878 | 3/1965 | Reyes | 252—316 |
| 3,415,758 | 12/1968 | Powell et al. | 252—316 |

RICHARD D. LOVERING, Primary Examiner

U.S. Cl. X.R.

106—308 C, 308 M; 117—100 A, 100 B, 100 C, 100 M; 149—3; 264—4; 424—32, 33, 35